（12）United States Patent
Bugga et al.

(10) Patent No.: US 8,889,300 B2
(45) Date of Patent: Nov. 18, 2014

(54) LITHIUM-BASED HIGH ENERGY DENSITY FLOW BATTERIES

(71) Applicant: California Institute of Technology, Pasadena, CA (US)

(72) Inventors: Ratnakumar V. Bugga, Arcadia, CA (US); William C. West, South Pasadena, CA (US); Andrew Kindler, San Marino, CA (US); Marshall C. Smart, Studio City, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 13/779,435

(22) Filed: Feb. 27, 2013

(65) Prior Publication Data

US 2013/0224550 A1 Aug. 29, 2013

Related U.S. Application Data

(60) Provisional application No. 61/603,754, filed on Feb. 27, 2012, provisional application No. 61/658,775, filed on Jun. 12, 2012.

(51) Int. Cl.
*H01M 4/13* (2010.01)
*H01M 4/58* (2010.01)

(52) U.S. Cl.
USPC .................................. 429/231.95; 429/231.9

(58) Field of Classification Search
None
See application file for complete search history.

(56) References Cited

U.S. PATENT DOCUMENTS

| | | | |
|---|---|---|---|
| 4,668,593 A | 5/1987 | Sammells |
| 4,945,012 A | 7/1990 | Bugga et al. |
| 4,966,823 A | 10/1990 | Bugga et al. |
| 5,019,470 A | 5/1991 | Bugga et al. |
| 5,066,748 A | 11/1991 | Nagasubramanian et al. |
| 5,110,694 A | 5/1992 | Nagasubramanian et al. |
| 5,272,359 A | 12/1993 | Nagasubramanian et al. |
| 5,360,686 A | 11/1994 | Peled et al. |
| 5,554,457 A | 9/1996 | Bugga et al. |
| 5,573,873 A | 11/1996 | Bugga et al. |
| 5,656,388 A | 8/1997 | Bugga et al. |
| 5,888,665 A | 3/1999 | Bugga et al. |
| 5,989,748 A | 11/1999 | Nagasubramanian |

(Continued)

OTHER PUBLICATIONS

Brushett et al., "An All-Organic Non-aqueous Lithium-Ion Redox Flow Battery", Adv. Energy Mater., 2012, vol. 2, pp. 1390-1396.

(Continued)

*Primary Examiner* — Cynthia K. Walls
(74) *Attorney, Agent, or Firm* — KPPB LLP

(57) ABSTRACT

Systems and methods in accordance with embodiments of the invention implement a lithium-based high energy density flow battery. In one embodiment, a lithium-based high energy density flow battery includes a first anodic conductive solution that includes a lithium polyaromatic hydrocarbon complex dissolved in a solvent, a second cathodic conductive solution that includes a cathodic complex dissolved in a solvent, a solid lithium ion conductor disposed so as to separate the first solution from the second solution, such that the first conductive solution, the second conductive solution, and the solid lithium ionic conductor define a circuit, where when the circuit is closed, lithium from the lithium polyaromatic hydrocarbon complex in the first conductive solution dissociates from the lithium polyaromatic hydrocarbon complex, migrates through the solid lithium ionic conductor, and associates with the cathodic complex of the second conductive solution, and a current is generated.

23 Claims, 9 Drawing Sheets

(56) References Cited

U.S. PATENT DOCUMENTS

| | | | |
|---|---|---|---|
| 6,074,453 A | 6/2000 | Anderson et al. | |
| 6,225,007 B1 | 5/2001 | Horne et al. | |
| 6,482,374 B1 | 11/2002 | Kumar et al. | |
| 6,492,064 B1 | 12/2002 | Smart et al. | |
| 6,558,836 B1 | 5/2003 | Whitacre et al. | |
| 6,764,525 B1 | 7/2004 | Whitacre et al. | |
| 6,905,762 B1 | 6/2005 | Jow et al. | |
| 6,919,054 B2 | 7/2005 | Gardner et al. | |
| 6,924,061 B1 | 8/2005 | Jow et al. | |
| 6,939,647 B1 | 9/2005 | Jow et al. | |
| 7,521,097 B2 | 4/2009 | Horne et al. | |
| 7,820,321 B2 | 10/2010 | Horne et al. | |
| 2010/0141211 A1 | 6/2010 | Yazami | |
| 2011/0045332 A1 | 2/2011 | Horne et al. | |
| 2011/0117411 A1 | 5/2011 | Horne et al. | |
| 2011/0223450 A1 | 9/2011 | Horne et al. | |
| 2012/0308856 A1 | 12/2012 | Horne et al. | |
| 2013/0011702 A1 | 1/2013 | Horne et al. | |
| 2013/0011704 A1 | 1/2013 | Horne et al. | |
| 2013/0022852 A1 | 1/2013 | Chang et al. | |

OTHER PUBLICATIONS

Connelly et al., "Chemical Redox Agents for Organometallic Chemistry", Chem. Rev., 1996, vol. 96, pp. 877-910.

Diao et al., "Analysis of Polysulfide Dissolved in Electrolyte in Discharge-Charge Process of Li-S Battery", Journal of the Electrochemical Society, 2012, vol. 159, No. 4, pp. A421-A425.

Doughty et al., "Batteries for Large-Scale Stationary Electrical Energy Storage", The Electrochemical Society Interface, Fall 2010, pp. 49-53.

Duduta et al., "Semi-Solid Lithium Rechargeable Flow Battery", Adv. Energy Mater., 2011, vol. 1, pp. 511-516.

Gupta et al., "Optimum lithium-ion conductivity in cubic $Li_{7-x}La_3Hf_{2-x}Ta_x)O_{12}$", Journal of Power Sources, 2012, vol. 209, pp. 184-188.

Ji et al., "A highly ordered nanostructured carbon-sulphur cathode for lithium-sulphur batteries", Nature Materials, Jun. 2009, vol. 8, pp. 500-506.

Liu et al., "Non-aqueous vanadium acetylacetonate electrolyte for redox flow batteries", Electrochemistry Communications, 2009, vol. 11, pp. 2312-2315.

Makarov et al., "Operational Impacts of Wind Generation on California Power Systems", IEEE Transactions on Power Systems, May 2009, vol. 24, No. 2, pp. 1039-1050.

Matsuda et al., "A rechargeable redox battery utilizing ruthenium complexes with non-aqueous organic electrolyte", Journal of Applied Electrochemistry, 1988, vol. 18, pp. 909-914.

Mouron et al., "The Economic Potential of the All-vanadium Redox Flow Battery With a Focus on State of Charge", University of Tennessee, Knoxville, University of Tennessee Honors Thesis Projects, May 2011, 25 pgs.

Rauh et al., "Formation of Lithium Polysulfides in Aprotic Media", J. inorg. nucl. Chem., 1977, vol. 39, pp. 1761-1766.

Skyllas-Kazacos et al., "Progress in Flow Battery Research and Development", Journal of The Electrochemical Society, 2011, vol. 158, No. 8, pp. R55-R79.

Tiyapiboonchaiya et al., "The zwitterion effect in high-conductivity polyelectrolyte materials", Nature Materials, Jan. 2004, vol. 3, pp. 29-32.

Wang et al., "All Solid-State Li/LixMno2 Polymer batter Using Ceramic Modified Polymer Electrolytes", Journal of The Electrochemical Society, 2002, vol. 149, No. 8, pp. A967-A972.

Wang et al., "Graphene-Wrapped Sulfur Particles as a Rechargeable Lithiumm-Sulfur Battery Cathode Material with High Capacity and Cycing Stability", Nano Lett., 2011, vol. 11, pp. 2644-2647.

Weber et al., "Redox Flow batteries: a review", J. Appl. Electrochem., 2011, vol. 41, pp. 1137-1164.

Xie et al., "$Li_6La_3SnMO_{12}$ (M=Sb, Nb, Ta), a Family of Lithium Garnets with High Li-Ion Conductivity", Journal of The Electrochemical Society, 2012, vol. 159, No. 8, pp. A1148-A1151.

Berlin et al., "Highly Active Chiral Ruthenium Catalysts for Asymmetric Cross- and Ring-Opening Cross-Methathesis", Angew. Chem. Int. Ed. 2006, 45, 7591-7595.

Boydston et al., "Cyclic Ruthenium-Alkylidene Catalysts for Ring-Expansion Metathesis Polymerization", J. Am. Chem. Soc., 2008, 130, 12775-12782.

Grubbs, "Olefin methathesis", Tetrahedron 60, 2004, 7117-7140.

Guidry et al., "Magic Ring Canenation by Olefin Methathesis", Organic Letters, 2007, vol. 7, No. 11, pp. 2129-2132.

Hilf et al., "Monofunctional Metathesis Polymers via Sacrificial Diblock Copolymers", Angew. Chem. Int. Ed. 2006, 45, 8045-8048.

Horne, "Nanocrystalline Lithium Transition-Metal Oxides for Lithium Rechargeable Batteries", The Electrochemical Society, 2000, pp. 1-7.

Horne et al., "Electronic Structure of Chemically-Prepared $Li_xMn_2O_4$ Determined by Mn X-ray Absorption and Emission Spectroscopies", J. Phys. Chem. B 2000, 104, 9587-9596.

Horne et al., "Innovative, Laser-Based Process for Development and Manufacturing of Solid Oxide Fuel Cells", Electrochemical Society Proceedings vol. 2005-07, pp. 466-475.

Horne et al., "Low-Cost Manufacturing of Solid Oxide Fuel Cell Components Using Laser Reactive Deposition (LRD™)", 2007 Society of Vacuum Coaters, 50th Annual Technical Conference proceedings, pp. 198-203.

Horne et al., "Structural Investigations of $Li_{1.5+x}Na_{0.5}MnO_{2.85|0.12}$ Electrodes by Mn X-Ray Absorption Near Edge Spectroscopy", Journal of The Electrochemical Society, 147 (2), 395-398 (2000).

Hou et al., "Template-Directed One-Step Synthesis of Cyclic Trimers by ADMET", J. Am. Chem. Soc., 2006, 128, 15358-15359.

Jaiswal et al., "Nanoscale $LiFePo_4$ and $Li_4Ti_5O_{12}$ for High Rate Li-Ion Batteries", Journal of The Electrochemical Society, 156, (12) A1041-A1046 (2009).

Kanaoka et al., "Synthesis of Block Copolymers of Silicon-Containing Norbornene Derivatives via Living Ring-Opening Metathesis Polymerization Catalyzed by a Ruthenium Carbene Complex", Macromolecules 1996, 28, 4707-4713.

Li et al., "Surface Analysis of Electrodes from Cells Containing Electrolytes with Stabilizing Additives Exposed to High Temperature", Journal of The Electrochemical Society, 155 (9), A648-A657 (2008).

Morrill et al., "Synthesis of tri-substituted vinyl boronates via ruthenium-catalyzed olefin cross-methathesis", Tetrahedron Letters, 45, 2005, 7733-7736.

Nagasubramanian, "Comparison of the thermal and electrochemical properties of $LiPF_6$ and $LiN(SO_2C_2F_5)_2$ salts in organic electrolytes", Journal of Power Sources, 2003, vol. 119-121, pp. 811-814.

Nagasubramanian, "Development of $Li/(CF_x)_n$ Battery at Sandia National Laboratories for Long-Lived Power Source Applications", ECS Transactions, 11 (32) 19-28 (2008).

Nagasubramanian, "Electrical characteristics of 18650 Li-ion cells at low temperatures", Journal of Applied Electrochemistry, 2001, vol. 31, pp. 99-104.

Nagasubramanian, "Fabrication and Testing Capabilities for 18650 Li/(DFx)n Cells", Int. J. Electrochem. Sci., 2 (2007) 913-922.

Nagasubramanian, "Two- and three-electrode Impedance studies on 18650 Li-ion cells", Journal of Power Sources, 2000, vol. 87, pp. 226-229.

Nagasubramanian et al., "A new chemical approach to improving discharge capacity of $Li/CF_x)_n$ cells", Journal of Power sources, 2007, vol. 165, pp. 630-634.

Nagasubramanian et al., "Electrical characterization of all-solid-state thin film batteries", Journal of Power Sources, 2004, vol. 136, pp. 395-400.

Nagasubramanian et al., "Hydrofluoroether electrolytes for lithium-ion batteries: Reduced gas decomposition and nonflammable", Journal of Power Sources 196 (2011) 8604-8609.

Nagasubramanian et al., "Improved performance of Li hybrid solid polymer electrolyte cells", Journal of Power Sources, 2006, vol. 162, pp. 847-850.

Nagasubramanian et al., "Performance enhancement at low temperatures and in situ X-ray analyses of discharge reaction of $Li/(CF_x)_n$ cells", Journal of Power Sources, 2007, vol. 170, pp. 179-184.

(56) References Cited

OTHER PUBLICATIONS

Orendorff et al., "Experimental triggers for internal short circuits in lithium-ion cells", Journal of Power Sources 196 (2011) 6554-6558.

Ratnakumar et al., "Effects of SEI on the kinetics of lithium intercalation", Journal of Power Sources 97-98 (2001) 137-139.

Ratnakumar et al., "The impedance characteristics of Mars Exploration Rover Li-ion batteries", Journal of Power Sources, 159, 2006, 1428-1439.

Ritter et al., "Rate Acceleration in Olefin Metathesis through a Fluorine-Ruthenium Interaction", J. Am. Chem. Soc., 2006, 128, 11768-11769.

Rodriguez et al., "In situ X-ray diffraction analysis of $(CF_x)_n$ batteries: signal extraction my multivariate analysis", J. Appl. Cryst. (2007). 40, 1097-1104.

Scherman et al., "Synthesis and Characterization of Stereoregular Ethylene-Vinyl Alcohol Copolymers Made by Ring-Opening Methathesis Polymerization", Macromolecules, 2005, 38, 9009-9014.

Smart et al, "Effects of Electrolyte Composition on Lithium Plating in Lithium-Ion Cells", Journal of The Electrochemical Society, 158 (4), A379-A389 (2011).

Smart et al., "Effect of Electrolyte Type Upon the High-Temperature Resilience of Lithium-Ion Cells", Journal of The Electrochemical Society, 152 (6), A1096-A1104 (2005).

Smart et al., "Electrochemical Characteristics of MCMB and $LiNi_xCo_{1-x}O_2$ Electrodes in Electrolytes with Stabilizing Additives", Journal of The Electrochemical Society, 155 (8) A557-A568 (2008).

Smart et al., "Life verification of large capacity Yardney Li-ion cells and batteries in support of NASA missions", International Journal of Energy Research, 2010, 34, 116-132.

Striebel et al., "Electrochemical Studies of Substituted Spinel Thin Films", Journal of The Electrochemical Society, 146 (12), 4339-4347 (1999).

Wenzel et al., "Ruthenium Metallacycles Derived from 14-Electron Complexes. New Insights into Olefin Methathesis Intermediates", J. Am. Chem.Soc., 2006, 128, 16048-16049.

West et al., "Electrodeposited amorphous manganese oxide nanowire arrays for high energy and power density electrodes", Journal of Power Sources, 126 (2004) 203-206.

West et al., "Implications of the first cycle irreversible capacity on cell balancing for $Li_2MnO_3$—$LiMO_2$ (M=Ni, Mn, Co Li-ion cathodes", Journal of Power Sources 196 (2011) 9696-9701.

West et al., "Preparation of high quality layered-layered composite $Li_2MnO_3$—$LiMO_2$ (M=Ni, Mn, Co) Li-ion cathodes by a ball milling-annealing process", Journal of Power Sources 204 (2012) 200-204.

West et al., "Radio Frequency Magnetron-Sputtered $LiCoPO_4$ Cathodes for 4.8 Thin-Film Batteries", Journal of The Electrochemical Society, 150 912) A1660-A1666 (2003).

West et al., "Reversible Intercalation of Fluoride-Anion Receptor Complexes in Graphite", Journal of The Electrochemical Society, 154 (1), A929-A936 (2007).

West et al., "Surfuryl and Thionyl Halide-Based Ultralow Temperature Primary Batteries", Journal of The Electrochemical Society, 157, (5), A571-A577 (2010).

Whitacre et al., "Enhanced Low-Temperature Performance of Li-Cfx Batteries", Electrochemical and Solid-State Letters, 10 (7) A166-A170 (2007).

Xia et al., "Well-Defined Liquid Crystal Gels from Telechelic Polymers", J. Am. Chem. Soc., 2008, 130, 1735-1740.

LITHIUM-BASED HIGH ENERGY DENSITY FLOW BATTERIES

CROSS-REFERENCE TO RELATED APPLICATIONS

The current application claims priority to U.S. Provisional Application No. 61/603,754, filed Feb. 27, 2012 and U.S. Provisional Application No. 61/658,775 filed Jun. 12, 2012, the disclosures of which are incorporated herein by reference.

STATEMENT OF FEDERAL FUNDING

The invention described herein was made in the performance of work under a NASA contract, and is subject to the provisions of Public Law 96-517 in which the Contractor has elected to retain title.

FIELD OF THE INVENTION

The present invention generally relates to lithium-based high energy density flow batteries.

BACKGROUND

"Flow batteries" have been considered for the storage and distribution of electrical energy. Like conventional batteries, flow batteries convert chemical energy of electro-active materials into electrical energy. However, in contrast to conventional batteries, flow-batteries typically store electro-active materials externally with respect a cell stack, and the electro-active materials are usually only introduced during battery operation. Typically, the electro-active materials are in liquid form and are pumped to a cell stack when the battery is being operated. Accordingly, flow-batteries can confer a number of benefits with respect to conventional batteries including they may be safer insofar as the electro-active materials are stored externally and they may be rapidly recharged by simply substituting the (typically liquid) externally stored electro-active materials. The viability and practicability of flow-batteries can be improved if they can more efficiently store and provide electrical energy, and if they can be produced more cost-effectively. Thus, there exists a need to develop more efficient and more cost-effective flow batteries.

SUMMARY OF THE INVENTION

Systems and methods in accordance with embodiments of the invention implement lithium-based high energy density flow batteries. In one embodiment, a lithium-based flow battery includes: a first anodic conductive solution that comprises a lithium polyaromatic hydrocarbon complex dissolved in a solvent; a second cathodic conductive solution that comprises a cathodic complex dissolved in a solvent; and a solid lithium ionic conductor, disposed so as to separate the first conductive solution from the second conductive solution, such that the first conductive solution, the second conductive solution, and the solid lithium ionic conductor define a circuit; where, when the circuit is closed, lithium from the lithium polyaromatic hydrocarbon complex in the first conductive solution dissociates from the lithium polyaromatic hydrocarbon complex, migrates through the solid lithium ionic conductor, and associates with the cathodic complex of the second cathodic conductive solution, and a current is generated.

In another embodiment, the first anodic conductive solution includes a lithium-naphthalene complex dissolved in a solvent.

In yet another embodiment, the first anodic conductive solution includes a solvent selected from one of: tetrahydrofuran, hexane, ethylene carbonate, propylene carbonate, dimethyl carbonate, diethyl carbonate, ethyl methyl carbonate, diethyl ether, dimethyl ether, gamma-butyrolactone, dimethoxyethane, dioxolane, methyl acetate, ethyl acetate, dimethyl acetamide, dimethyl formamide, dimethyl sulfoxide, and mixtures thereof.

In still another embodiment, the second cathodic conductive solution includes one of: an organic species and an organometallic species.

In still yet another embodiment, the second cathodic conductive solution includes dichloro-dicyanoquinodimethane.

In a further embodiment, the second cathodic conductive solution includes a solvent that is one of: tetrahydrofuran, hexane, ethylene carbonate, propylene carbonate, dimethyl carbonate, diethyl carbonate, ethyl methyl carbonate, diethyl ether, dimethyl ether, gamma-butyrolactone, dimethoxyethane, dioxolane, methyl acetate, ethyl acetate, dimethyl acetamide, dimethyl formamide, dimethyl sulfoxide, and mixtures thereof.

In a yet further embodiment, the second cathodic conductive solution includes a lithium polysulfide.

In a still yet further embodiment, the second cathodic conductive solution includes lithium polysulfides in the form of $Li_xSn$ where $3 \leq n \leq 8$ In a further embodiment, the solid lithium ionic conductor is ceramic.

In a still further embodiment, the solid lithium ionic conductor includes garnet phases.

In yet another embodiment, the solid lithium ionic conductor includes lithium lanthanum titanate.

In another embodiment, the solid lithium ionic conductor is a solid polymer electrolyte.

In a further embodiment, the solid polymer electrolyte includes copolymers.

In a still further embodiment, the solid lithium ion conductor is a LISICON.

In yet another embodiment, a lithium-based flow battery includes: a cell that includes a first channel, a first current collector, the solid lithium ion conductor, a second channel, and a second current collector; a first pump for pumping the first anodic conductive solution through the first channel of the cell; a first tank for storing the first anodic conductive solution before it is pumped through the first channel of the cell; a second tank for storing the first anodic conductive solution after it has been pumped through the first channel of the cell; a second pump for pumping the second cathodic conductive solution through the second channel of the cell; a third tank for storing the second cathodic conductive solution before it has been pumped through the second channel of the cell; and a fourth tank for storing the second cathodic conductive solution after it has been pumped through the second channel of the cell; where the first current collector and the second current collector can conduct current generated by redox reactions that occur in the cell, and can thereby power a load.

In another embodiment, one of the first pump and the second pump comprises a material selected from one of: silicon, Teflon, graphite, and Viton.

In still another embodiment, at least one of the first current collector and the second current collector comprises one of: graphite paper, graphite felt, and Toray carbon paper.

In another embodiment, a lithium-based flow battery includes: a lithium-based anode; a cathode that is a conductive solution that includes an oxidizing agent that can facilitate the oxidation of the lithium-based anode; and a solid lithium ionic conductor, disposed so as to separate the lithium-based anode from the cathode, such that the lithium-based anode, the cathode, and the solid lithium ionic conductor define a circuit; where, when the circuit is closed, lithium from the lithium-based anode migrates through the solid lithium ionic conductor, and associates with the oxidizing agent in the cathode, and a current is generated.

In yet another embodiment, the lithium-based anode is a solid.

In still another embodiment, the lithium-based anode is a conductive solution that includes a lithium polyaromatic hydrocarbon complex dissolved in a solvent.

In still yet another embodiment, the cathode includes lithium polysulfides dissolved in a solvent.

In a further embodiment, the cathode includes lithium polysulfides in the form of $Li_xSn$ where $3 \leq n \leq 8$ In a still further embodiment, the solvent is one of: tetrahydrofuran, dimethyl sulfoxide, dimethyl formamide, dioxolane, dimethyl acetamide, dimethyl ether, dimethyl ether, a polar aprotic solvent, and mixtures thereof.

DETAILED DESCRIPTION

Turning now to the drawings, systems and methods for implementing lithium-based high energy density flow batteries are illustrated. In many embodiments, lithium-based high energy density flow batteries include a pair of coupled electrodes formed from solvated electron solutions (SES) having a potential energy difference there between and an ionically conducting separator. In many embodiments, the solvated electron solutions include a first anodic conductive solution that includes an anodic lithium polyaromatic hydrocarbon complex ($Li\text{-}PAH_A$) dissolved in a suitable solvent, and a second cathodic conductive solution that can include a cathodic polyaromatic hydrocarbon complex ($PAH_B$) or cathodic lithium polysulfide complex dissolved in a suitable solvent. In many embodiments, the ionically conducting separator includes a Solid Lithium Ion Conductor (SLIC). The first anodic conductive solution, the second cathodic conductive solution, and the Solid Lithium Ion Conductor (SLIC) may be arranged so as to form the circuit of a flow battery; when the circuit is closed, current is generated, and lithium ions dissociate from the lithium polyaromatic hydrocarbon complex in the first anodic conductive solution, migrate through the SLIC, and associate with the cathodic complex of the second cathodic conductive solution. In embodiments where the cathode complex includes a polyaromatic hydrocarbon, this lithium ion exchange between SES systems may be characterized by the following redox reactions

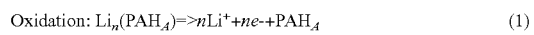

Oxidation: $Li_n(PAH_A) \Rightarrow nLi^+ + ne^- + PAH_A$ (1)

Reduction: $Li^+ + ne^- + PAH_B \Rightarrow Li_n(PAH_B)$ (2)

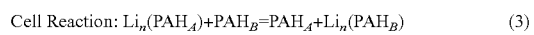

Cell Reaction: $Li_n(PAH_A) + PAH_B = PAH_A + Li_n(PAH_B)$ (3)

In these embodiments, the first conductive solution acts as an anode insofar as it undergoes oxidation, while the second conductive solution acts as a cathode insofar as it undergoes reduction.

Figure 1A:
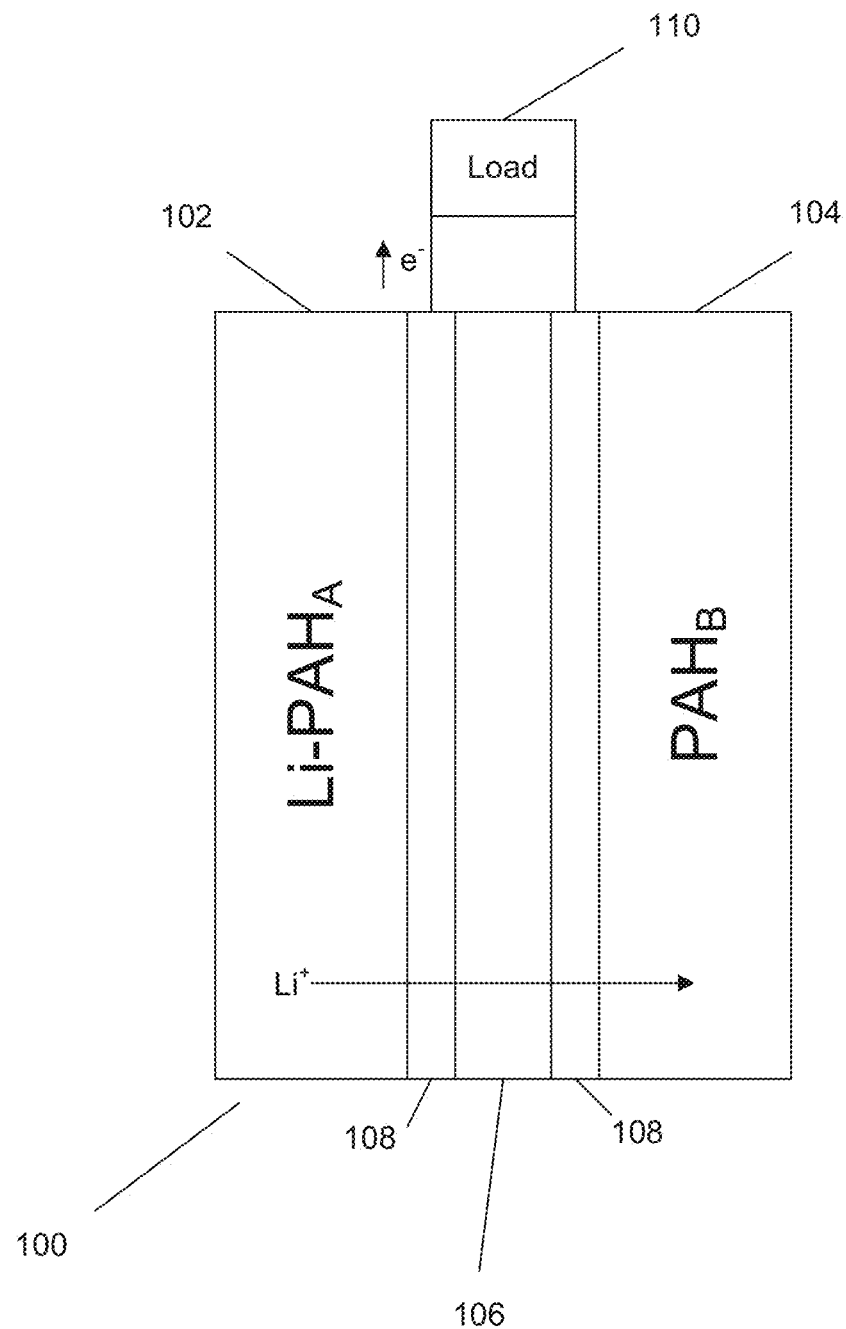
FIG. 1A illustrates the cell of a lithium-based high energy density flow battery during load powering in accordance with an embodiment of the invention.

FIG. 1A illustrates the cell of a flow battery that utilizes polyaromatic hydrocarbons to facilitate redox reactions and thereby provide a lithium-based high energy density flow battery. In the illustrated embodiment, the flow battery cell 100 includes an anodic lithium polyaromatic hydrocarbon complex ($Li\text{-}PAH_A$) solution 102, a cathodic polyaromatic hydrocarbon complex ($PAH_B$) solution 104, a Solid Lithium Ion Conductor 106, and current collectors 108. The flow battery cell powers a load 110. When the flow battery cell circuit is closed, e.g. when it is powering a load, the redox reactions result in electrons flowing from the $Li\text{-}PAH_A$ complex solution 102 to the $PAH_B$ complex solution 104, and accordingly an exchange of lithium cations from the $Li\text{-}PAH_A$ complex solution 102 to the $PAH_B$ complex solution 104. Note that unlike many conventional batteries, because the ion and electron exchange occurs primarily chemically within the SES systems and not at the current collectors, the current collectors 108 are used primarily for current collection purposes and are largely not consumed by the chemical reactions. Therefore, generally speaking, they do not undergo morphological or interfacial changes—in conventional batteries, it can be problematic if electrodes/current collectors undergo morphological or interfacial changes. Note also that because the SES systems making up the anode (anolyte) and cathode (cathloyte) are electronically conducting, the flow battery can function without a salt bridge; e.g., the lithium ions that dissociate from the $Li\text{-}PAH_A$ themselves directly participate in the reduction at the cathode.

Figure 1B:
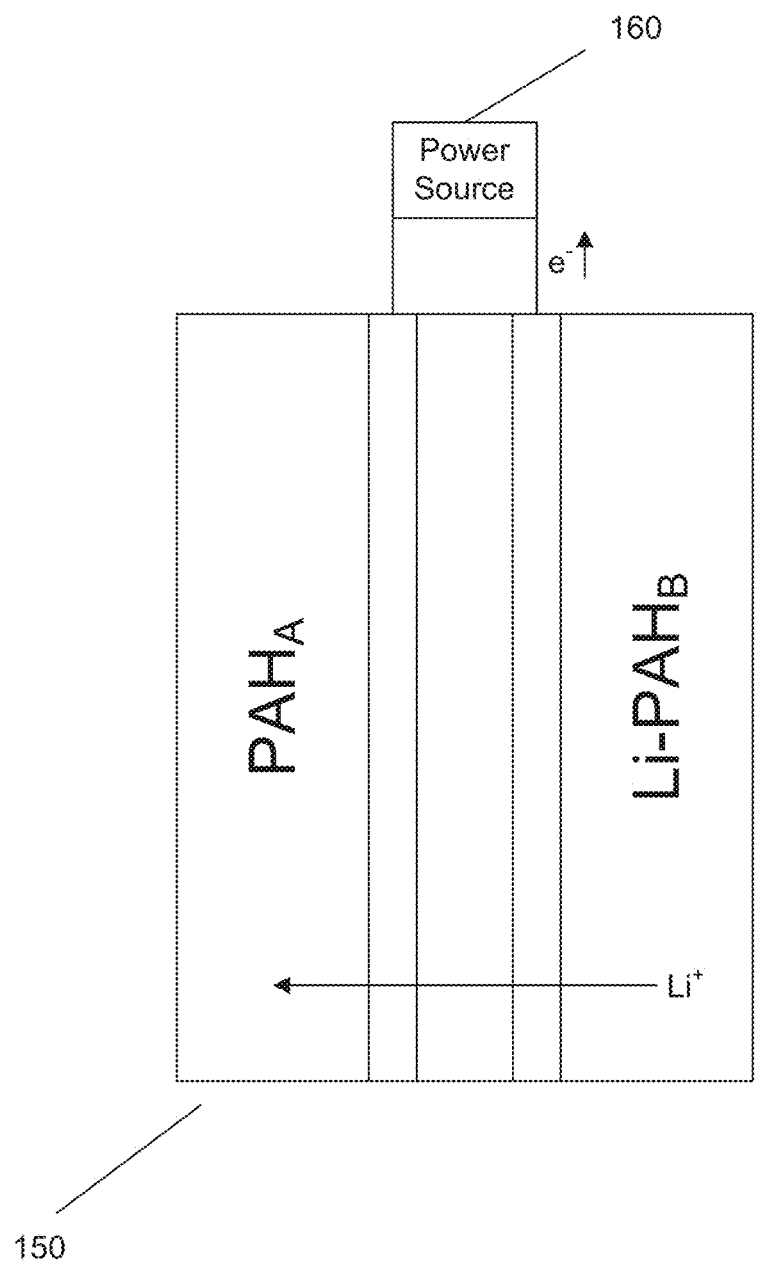
FIG. 1B illustrates the cell of a lithium-based high energy density flow battery during recharging in accordance with an embodiment of the invention.

Additionally, in many embodiments, a lithium-based high energy density flow battery is rechargeable. FIG. 1B illustrates the recharging of a flow battery similar to that depicted in FIG. 1A. In the illustrated embodiment, the flow battery 150 has 'died' in that lithium has substantially dissociated from the $PAH_A$ complex and associated with $PAH_B$ complex. Accordingly, when the flow battery 150 is supplied with electrical energy, e.g. from a power source 160, lithium cation and electron migration to the $PAH_A$ solution can be induced, thereby causing the formation of $Li\text{-}PAH_A$, and effectively recharging the flow battery. Lithium ions thus shuttle from the anodic SES to the cathodic SES upon discharge and vice versa on charge.

Notably, a lithium-based high energy flow battery in accordance with embodiments of the invention can yield substantial improvements over conventional flow batteries. For example, a conventional Vanadium Redox Flow Battery ("VRB") has a specific energy of approximately 25 Wh/kg, an energy density of approximately 20-30 Wh/L, a cell voltage of 1.41 V, and a cost of approximately $180/Wh. Conversely, a lithium-based high energy density flow battery in accordance with embodiments of the invention may achieve the following metrics: a specific energy of approximately 290 Wh/kg; an energy density of approximately 350 Wh/L; a cell voltage of approximately 2 V; and a cost of approximately $90/Wh. Accordingly, in many embodiments, a lithium-based high energy density flow battery can be used to support a power grid by storing and/or distributing electrical energy efficiently. In numerous embodiments, a lithium-based high energy density flow battery can be used in conjunction with transportation systems.

Of course, the particular electrical capabilities of lithium-based high energy density batteries will be contingent on the particular configuration and the exact materials used to construct the flow battery's various constituent components. Configurations and constituent materials that can be used to construct a lithium-based high energy density battery in accordance with embodiments of the invention are now discussed below.

Lithium-Based Anode

In many embodiments, a lithium-based high energy density flow battery utilizes a lithium-based anode in generating current. In particular, oxidation takes place at the lithium-based anode, and thereby forms electrons that can be used in generating current. The lithium-based anode can be a liquid or it can be a solid for example. Importantly, the lithium-based anode can be conductive, and a liquid lithium-based anode that is conductive can be referred to as an "anolyte." It can be desirable for the lithium-based anode to have the following characteristics: 1) high mass and volume capacity of the anode (e.g. measured in Ah/kg and Ah/l, respectively); 2) low working voltage, e.g. less than 1 V as compared to lithium; 3) electrochemical reversibility; 4) compatibility in a flow battery system that utilizes fast reaction kinetics; 5) low cost; and/or 6) low toxicity. Thus, a lithium-based anode may be used that achieves one or more of these goals.

In many embodiments, a liquid lithium-based anolyte includes an electron donor metal, i.e. lithium, and an electron acceptor that are combined in a solvent and form a solvated electron solution, the combination being capable of participating in oxidation and reduction reactions useful for a rechargeable flow battery. Lithium salts may also be added to the anolyte to further enhance performance in accordance with some embodiments. Suitable solvents that can be used include: tetrahydrofuran, hexane, ethylene carbonate, propylene carbonate, dimethyl carbonate, diethyl carbonate, ethyl methyl carbonate, diethyl ether, dimethyl ether, gamma-butyrolactone, dimethoxyethane, dioxolane, methyl acetate, ethyl acetate, dimethyl acetamide, dimethyl formamide, and/or dimethyl sulfoxide, as well as other organic carbonates, esters, and ethers that serve as polar aprotic solvents. Additionally, the solvent that is used can be a mixture of the aforementioned solvents. Mixed solvents may provide enhanced ionic conductivities as compared to single solvents. Generally, it may be preferable to use a solvent that has a high solubility, e.g. one that can dissolve up to approximately 15 M of electron donor metals, electron acceptors, and the lithium salt. Under these circumstances, the anolyte may have sufficient energy density.

In many embodiments, the lithium-based anolyte includes lithium (acting as an electron donor metal) and naphthalene (acting as an electron acceptor), combined at a concentration of 10 M in a suitable organic solvent, the combination being capable of participating in oxidation and reduction reactions useful for rechargeable systems. The theoretical energy density of a lithium-naphthalene anolyte can be approximated in accordance with the formula:

$$E = ncFV/3600d \quad (4)$$

where: E is the energy density in Wh/kg; n is the ratio of lithium to naphthalene, c is the naphthalene concentration in mol/L; F is the Faraday constant; V is the average open-circuit voltage; and d is the solution density in kg/L. For naphthalene in a tetrahydrofuran solvent and using a 3.0 V cathode (e.g. an oxygen cathode), we can assume: n=2; c=12.4 M; d~1 kg/L; and V=2.7 V. In accordance with these parameters, the theoretical energy density is roughly 1800 Wh/kg. By contrast, a lithium-graphite anode has a theoretical energy density of about 1000 Wh/kg.

In addition to naphthalene, other polycyclic aromatic compounds can be used, including, but not limited to, anthracene, tetracene, pentacene, azulene, phenanthrene, C60 and C70.

Although particular implementations of the lithium-based anodes have been elaborated on, any of a variety of constituent components can be incorporated to provide a lithium-based anolyte in accordance with embodiments of the invention. For example, different electron receptors, solvents, and reactant concentrations may be used to provide a lithium-based anolyte, all in accordance with embodiments of the invention. Additionally, although a anolyte has been elaborated on, a solid metal lithium anode may also be used. Alternately, various lithium alloys, such as Li—Si, Li—Sb, Li—Sn and Li—Al or even graphite or carbon (MCMB), may be used as anodes in the proposed flow batteries. Where a solid metal lithium metal or alloy anode is used in conjunction with a liquid cathode (discussed below) to form a flow battery, the flow battery can be characterized as a "hybrid flow battery". Additionally, an anode/anolyte may be used that is compatible with sufficiently expedient electrochemical kinetics, e.g. greater than approximately 50 mA/cm$^2$. For example, the anode/anolyte may include an electrocatalyst to further expedite the electrochemical kinetics. The kinetics of the oxidation reactions occurring at the anode/anolyte may also be at least partly a function of the current collector, and the current collector is discussed below.

Current Collector

In many embodiments, a lithium-based high energy density flow battery uses current collectors to conduct current resulting from the redox reactions. Unlike in conventional batteries where an electrode functions as a current collector, in flow batteries where liquid anodes and cathodes are used, the current collectors are not necessarily consumed. Instead they generally function to exclusively conduct current. Accordingly, the current collectors may not be subject to any substantial morphological or interfacial changes, and can thereby sustain a longer cycle life. Of course, where a solid metal lithium anode is used, the solid lithium anode may be consumed, and undergo morphological and/or interfacial changes during cycling.

The current collectors may be fabricated from graphite and may be configured to provide a high surface area so as to facilitate reaction kinetics. For instance, in many embodiments, graphite current collectors are used and facilitate the development of a current density of greater than approximately 50 mA/cm$^2$ within a lithium-based high energy density flow battery. Graphite paper, graphite felt, and/or Toray carbon paper may also be used in accordance with embodiments of the invention. Of course, although particular materials have been referenced in the fabrication of current collectors, any suitable material may be used to fabricate current collectors that can be used in lithium-based high energy density batteries. The solid lithium ion conducting membrane is now discussed.

Solid Lithium Ion Conducting (SLIC) Membrane

In many embodiments, a lithium-based high energy density flow battery includes a solid lithium ion conducting ("SLIC") membrane to allow lithium cations to flow to and from the cathode during battery operation and charging respectively. In particular, in the context of a lithium-based high energy density flow battery, the oxidation of a lithium-based anode causes the production of electrons and lithium cations. When the flow battery circuit is closed, the electrons can flow through the current collectors and the load to the cathode (during battery discharging), whereas on the other hand, the lithium cations can flow through the SLIC membrane to the cathode. Accordingly, it may be desirable that the SLIC membrane have: high lithium ion conductivity, e.g. greater than $10^{-3}$ S/cm2, with unit transport number (single ion conductor); good electrochemical stability at the anode and cathode potentials, e.g. between approximately 0.5 V and approximately 4.5 V; non-permeability to the reactant solutions; mechanical rigidity (without swelling); and adequate mechanical flexibility for cell fabrication. It may be further preferable that the SLIC membrane is scalable, e.g. from 25 cm$^2$ membrane to a 150 cm$^2$ membrane.

The SLIC membrane can be implemented using any variety of suitable materials. In many embodiments, the SLIC membrane is implemented using ceramic/glassy solid lithium conductors. These materials are advantageous in terms of being mechanically robust with less swelling in organic solvents. The ceramic/glassy solid lithium conductors may be thin, pore-free, and have high ionic conductivity. The ceramic/glassy SLIC membrane may also be sufficiently flexible to be operable in the context of a lithium-based high energy density flow battery. In many embodiments, the ceramic/glassy SLIC membrane is achieved using garnet phases. Ceramic/glassy SLIC membranes based on garnet phases can provide high lithium ionic conductivity, can be chemically and electrochemically stable at the electrode, and can further be inherently safe. For example $Li_{7-x}La_3Hf_{2-x}Ta_xO_{12}$ is a garnet oxide that may be used to form the SLIC membrane. Similar solid electrolytes include lithium lanthanum titanate and lithium phosphorous oxynitride (LiPON). Likewise, a commercial ceramic electrolyte such as Ohara may be utilized, Such a material may be formed by taking the constituent elements in their stoichiometric proportions, mixing them with a mortar and pestle before reacting them at 950° C. for 12 hours. The resultant product may then be reground and pressed into pellets. The pellets may be transferred to an alumina crucible layer and covered with mother powder from all sides, followed by sintering at high temperature to form a single-phase material. Electrical conductivity measurements have confirmed a room temperature $Li^+$ conductivity of 0.345 mS/cm for the pellets, where $0.4 \leq x \leq 0.5$. Subsequently, the garnet pellets may be ground, mixed with 1 wt. % PVB (polyvinyl butyrate) binders and 10 wt. % carbon, pressed into a pellet with a size of 1" diameters and 1 mm thickness and sintered in air at 1100° C. for 24 hours to produce the membrane. The details of the formation of such a material were published by A. Gupta, et al., in *J. Power Sources* 2012, 209, 184 and also published by H. Xie, et al., in *J. Electrochem. Soc.*, 2012, the publications of which are hereby incorporated by reference. Similar processes may be used to develop more pliable SLIC membranes. Additionally, Sol-gel processing/slurry coatings may be used to produce dense layers of these materials.

Lithium solid polymer electrolytes may also be used to implement SLIC membranes in accordance with embodiments of the invention. For example, a polyethylene oxide (PEO)-based solid polymer may be used, as such polymers demonstrate good $Li^+$ ion mobility at 80° C. In many embodiments, the lithium solid polymer electrolyte is stabilized by using bridging ethers in the PEO but removing these ether moieties from the primary backbone of the polymer to improve stability. For example, 12-crown-4 ethers, known to stabilize Li+, can be used as a pendant moiety on a backbone of polystyrene, polyethylene, or polysulfone.

Although particular SLIC membrane structures have been described, SLIC membrane structures may be implemented in any variety of ways. For example, the SLIC membrane may be a PVDF gel polymer. Additionally, in some embodiments the SLIC membrane structure is implemented using Lithium Superionic Conductors (LISICON) and/or lithium thiophosphate. Cathode structures that can be incorporated in to lithium-based high energy density flow batteries are discussed below.

Liquid Organic Cathodes

A lithium-based high energy density flow battery utilizes a liquid organic cathode in many embodiments (liquid cathodes that are conductive can be referred to as "catholytes"). For example, a solvated electron system (e.g. similar to the anolyte described above) may be used as a cathode, or the cathodes may be based on organometallic complexes. It is preferable that the cathode have: 1) high mass and volume capacity of the anode (e.g. measured in Ah/kg and Ah/l, respectively); 2) high working voltage, for example greater than approximately 3 V as compared to lithium; 3) electrochemical reversibility; 4) compatibility in a flow battery system that utilizes fast reaction kinematics; 5) low cost; and/or 6) low toxicity.

Figure 2A:
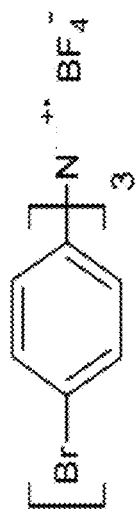
FIGS. 2A-E illustrate organic cathode materials in accordance with embodiments of the invention.
Figure 2B:
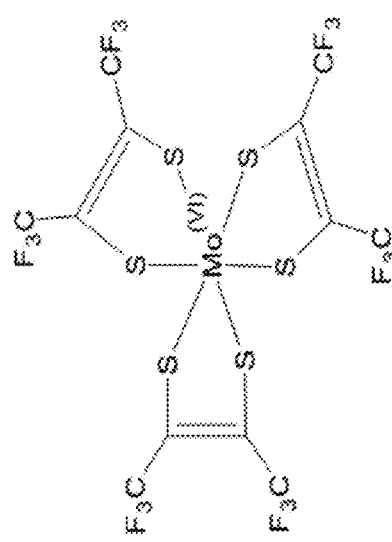
Figure 2C:
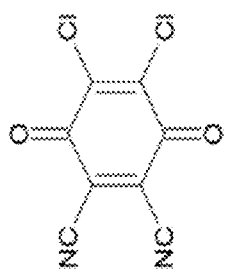
Figure 2D:
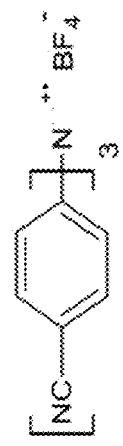
Figure 2E:
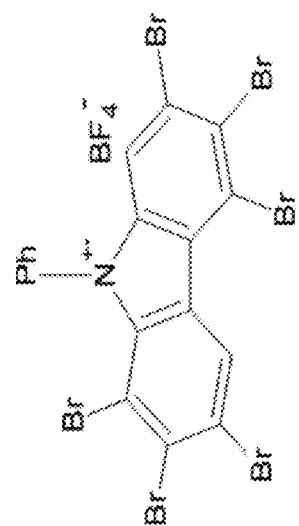
Figures 3A, 3B:
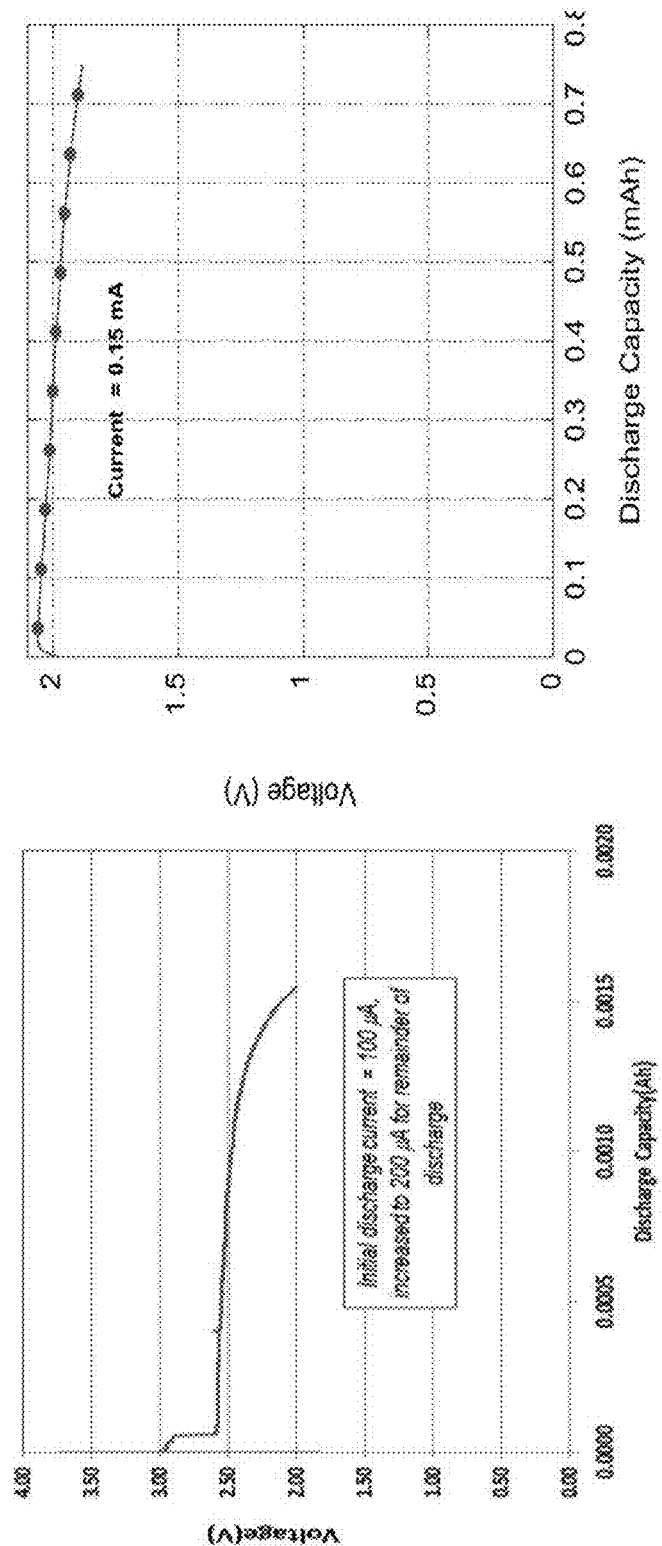
FIGS. 3A and 3B provide two data plots illustrating the discharge of a Li naphthalide/DDQ cell with a PVDF gel polymer electrolyte in accordance with an embodiment of the invention.

In many embodiments, liquid organic cathodes may be realized by dissolving any of a wide range of organic and organometallic species, including dichloro-dicyanoquinodimethane (DDQ), molybdenum tris-1,2-bis(trifluoromethyl)ethane-1,2-dithiolene (Mo(tfd)$_3$), 3-BrN, 3-CNN, and 6-BrN, in certain solvents of electrochemical interest, e.g. tetrahydrofuran, hexane, ethylene carbonate, propylene carbonate, dimethyl carbonate, diethyl carbonate, ethyl methyl carbonate, diethyl ether, dimethyl ether, gamma-butyrolactone, dimethoxyethane, dioxolane, methyl acetate, ethyl acetate, dimethyl acetamide, dimethyl formamide, and/or dimethyl sulfoxide, as well as other organic carbonates, esters, and ethers that serve as polar aprotic solvents, or even mixtures thereof. The following reduction potentials have been demonstrated: DDQ=3.5 V; Mo(tfd)$_3$=4.0 V for the first reduction and 3.5 V for the second reduction; 3-BrN=4.1 V; 3-CNN=4.5 V; 6 BrN=4.7 V. FIGS. 2A-2E depict the chemical structures of the aforementioned species. In particular, FIG. 2A illustrates DDQ, FIG. 3B illustrates Mo(tfd)3, FIG. 2C illustrates 3-BrN, FIG. 2D illustrates 3-CNN, and FIG. 2E illustrates 6-BrN. FIGS. 3A and 3B illustrate the discharge capacity of a Li-naphthalide/DDQ cell with a PVDF gel polymer electrolyte.

In many embodiments, the flow battery may rely on redox reactions that exhibit multi-lithium reduction (thereby generating a greater potential difference). For example, in several embodiments, the liquid organic cathode is based on organometallic complexes such as molybdenum tris[1,2-bis(trifluoromethyl) ethane-1,2-dithiolene], and thereby results in multi-lithium reduction.

The energy density (Ah/L) of the final flow cell design will depend significantly on the solubility of the cathode species in both oxidized and reduced forms. The liquid organic cathodes may also be modified through employing custom-modified cathode materials, e.g. improving solubility through suitable alkylation, or improving electrochemical stability through introduction of "blocking" group substitution. Like the anolyte, it is preferable that the catholyte have a reactant concentration of greater than approximately 10 M. Additionally, like the anolyte, lithium salts may be included to increase electrical properties, and electrocatalysts may be included to facilitate electrochemical kinetics.

Although particular liquid organic cathodes have been elaborated on, many different types of cathodes can be used in accordance with embodiments of the invention. For example, sulfur-based cathodes may be incorporated in accordance with embodiments of the invention, and this is discussed below.

Polysulfide Cathode

In numerous embodiments, a lithium-based high energy density flow battery incorporates a soluble polysulfide cathode, or catholyte. Sulfur-based cathodes are desirable in view of their low cost and environmental compatibility. Moreover, sulfur based cathodes have historically demonstrated excellent performance and cycle life in high temperatures, and can have good electrochemical reactivity. Nonetheless, the incorporation of sulfur-based cathodes has been problematic in conventional lithium-sulfur batteries. However, the inventors of the instant application have successfully been able to incorporate sulfur-based catholytes in lithium-based high energy density flow batteries. For example, in several embodiments, polysulfide, e.g. $S_3$-$S_8$, is dissolved in one of the following solvents: tetrahydrofuran, dimethyl sulfoxide, dimethyl formamide, dioxolane, dimethyl acetamide, dimethyl ether, diethyl ether, and other polar aprotic solvents. In many embodiments polysulfide is dissolved in a combination of solvents; the electrical properties of the catholyte may be enhanced when a combination of solvents is used. Note that the solubility of polysulfides can vary greatly based on different solvents. In numerous embodiments, polysulfide is dissolved at a concentration of greater than approximately 10 M. In many embodiments, solvents with high basicity are used. Importantly, the polysulfides can be selected so that they maintain their solubility even when they associate with the lithium cations; in this way, they can maintain their compatibility with the redox reactions that occur in a flow battery. In particular, the polysulfide catholytes can be selected such that they cause the reduction of $Li^+$ such that $Li_xS_n$ products are formed, where n is greater than or equal to 3 and less than or equal to 8—in this range of n, the polysulfide may be soluble. However, note that polysulfide solubilities can vary widely in different solvents as a result of solvent-solute interactions. The formation of $Li_2S_n$ in certain aprotic media can be accomplished either by electrochemical reduction of $S_8$ or by direct in situ reaction of $S_8$ with Li or $Li_2S$. In many embodiments, the polysulfide—solvent combination is selected so that a specific capacity of approximately 500 mAh/g and a current density of approximately 50 mA/cm$^2$ is achieved. In several embodiments, polysulfide catholytes are used that have a specific capacity of between approximately 900-1000 mAh/g at a voltage of about 2.1 V.

Figure 4:
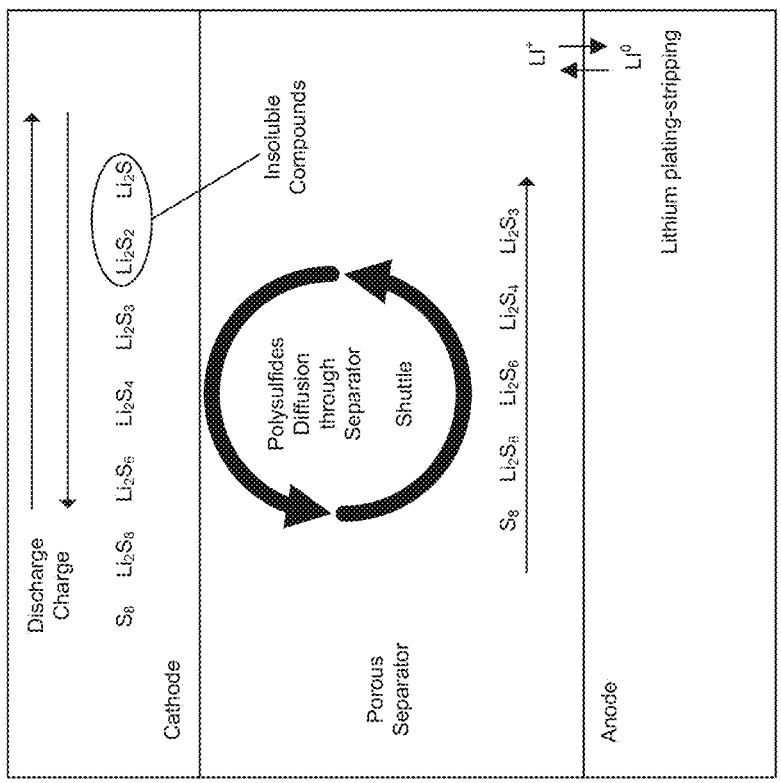
FIG. 4 provides a reaction schematic of lithium polysulfides in a flow battery in accordance with an embodiment of the invention.

FIG. 4 illustrates of the redox reactions of a polysulfide catholyte in a flow battery in accordance with embodiments of the invention. Note that in the illustrated embodiment, the polysulfides cause reduction. Additionally, note that the lithium-polysulfide compound is soluble in the form $Li_2S_n$, where n is greater than or equal to 3 and less than or equal to 8.

Of course there exist many combinations and permutations of the above-described constituent materials that can be implemented in accordance with embodiments of the invention to provide a lithium-based high energy density flow battery. The above description is simply meant to be illustrative, and not limiting. Design configurations of the flow battery are now discussed.

Flow Battery Architectures and Flow Battery Cell Design

Figure 5A:
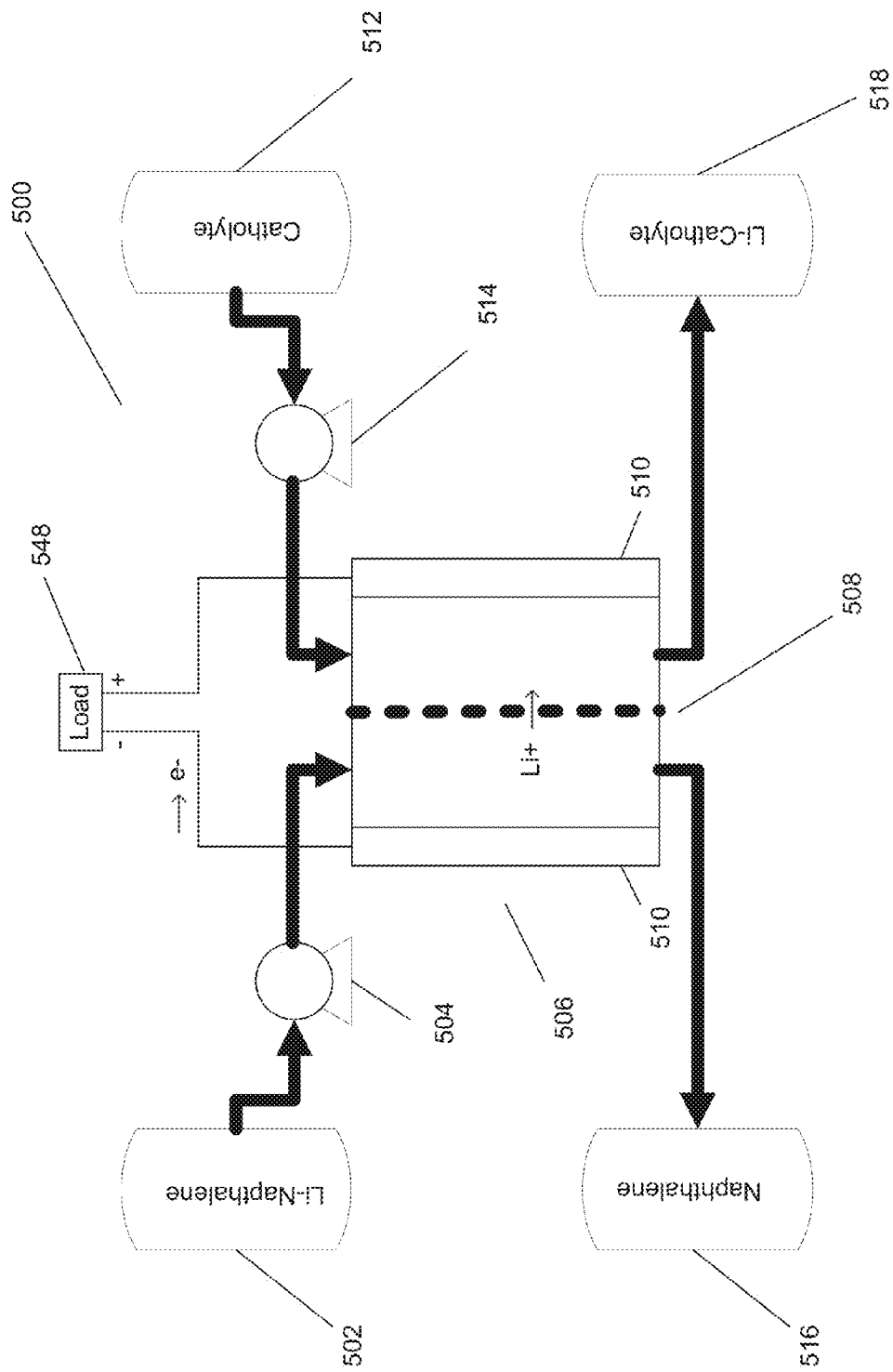
FIG. 5A provides a system flow diagram for the operation of a lithium-based high energy density flow battery that implements a conventional flow battery architecture.

Lithium-based high energy density flow batteries can employ standard flow-battery architectures. For example, flow batteries architectures where the anolyte and catholyte are pumped from an initial tank through a flow battery cell, and into a second tank can be implemented. FIG. 5A illustrates a lithium-based high energy density flow battery that uses a lithium-naphthalene anolyte and that employs a conventional flow battery architecture in accordance with embodiments of the invention. In the illustrated embodiment, a tank 502 contains a lithium-naphthalene complex that serves as the anolyte. A pump 504 pumps the anolyte through a cell 506 that includes a SLIC membrane 508 and current collectors 510. As the lithium-naphthalene flows through the cell 506, lithium is oxidized thereby producing lithium cations and corresponding electrons; the oxidation is induced by the simultaneous flow of a catholyte through the cell 506. In particular, a second tank 512 houses a catholyte, and a second pump 514 pumps the catholyte through the cell 506, which thereby facilitates the redox reactions. Electrons resulting from the oxidation can flow through the current collector 510 from the anolyte side, power a load 548, and flow through the current collector 510 on the catholyte side. Lithium cations formed from the oxidation can flow through the SLIC membrane and thereby prevent a charge build-up. As the anolyte leaves the cell 506, it is stored in a tank 516. Similarly, as the catholyte leaves the cell 506, it is stored in a tank 518. Note that, lithium cations have migrated from the anolyte to the catholyte; therefore the anolyte becomes a naphthalene solution (to the extent that lithium has dissociated from the lithium-naphthalene complex) after it passes through the cell 506, and the catholyte becomes a Li-catholyte solution (to the extent that lithium has associated with the oxidizing agent) as it leaves the cell 506.

Figure 5B:
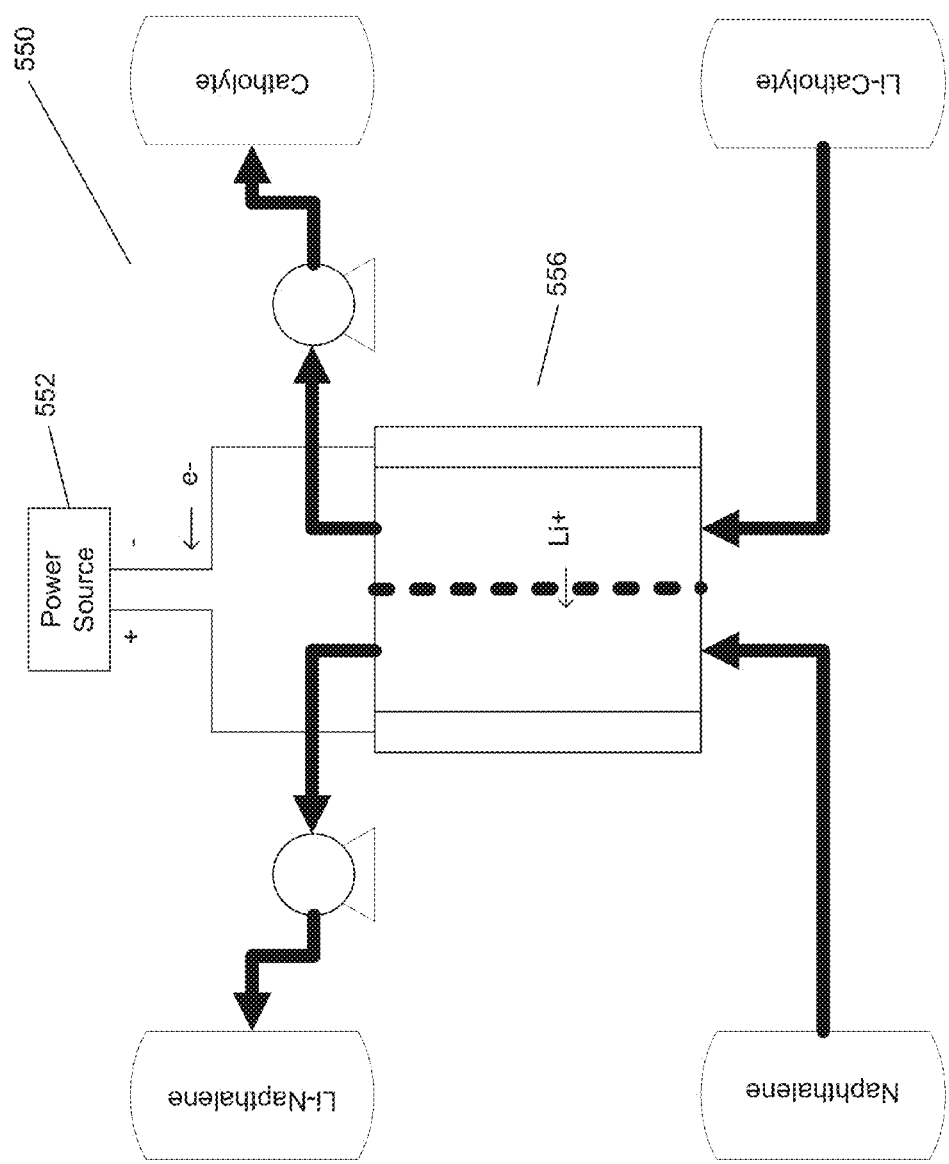
FIG. 5B provides a system flow diagram for the recharging of a lithium-based high energy density flow battery that implements a conventional flow battery architecture.

In many embodiments, the lithium-based high energy density flow battery can be operated reversibly using a standard flow-battery architecture; in other words, it can be "charged". FIG. 5B illustrates the charging of the lithium-based high energy density flow battery seen in FIG. 5A. FIG. 5B is similar to FIG. 5A, except that the flow battery 550 is being operated in reverse and is thereby being charged. Therefore, instead of a load 548 being powered by the flow battery, a power source 552 is charging the flow battery. Accordingly, the lithium catholyte solution and naphthalene solution are being pumped through the cell 556 in a reverse direction with respect to that illustrated in FIG. 5A. The power source 552 causes the oxidation of the lithium-catholyte solution, and as a result, lithium cations flow from the lithium catholyte solution and adjoin with the naphthalene solution to form the lithium-naphthalene solution.

Figure 6:
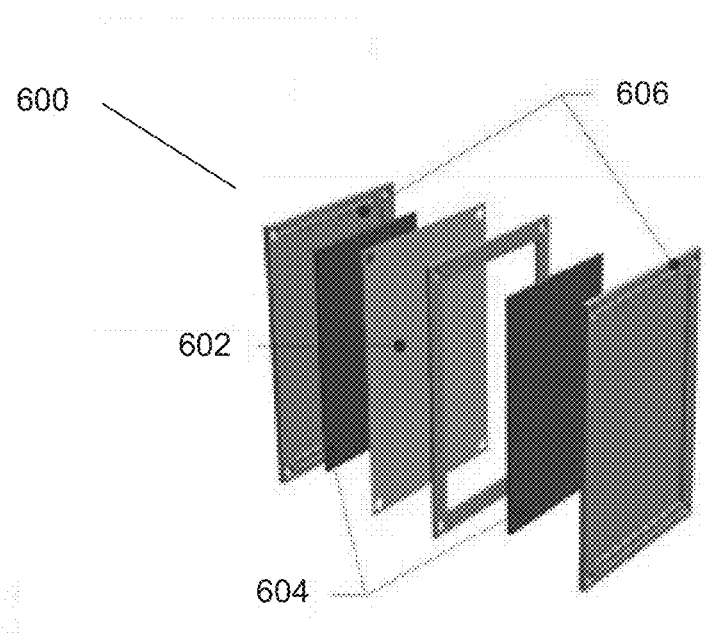
FIG. 6 provides a schematic of a flow battery cell architecture that can be implemented in accordance with embodiments of the invention

Additionally, a lithium-based high energy density flow battery in accordance with many embodiments can implement a standard flow-battery cell architecture. For example, in some embodiments, a stacked cell architecture is used. A tubular flow-battery design may also be implemented. In many embodiments, a parallel plate architecture is implemented, and in-field manifolding, combined with bipolar plate design, is used. In some embodiments, the stack biplates are fabricated from one of: Kynar-carbon and CVD coated POCO-graphite. FIG. 6 illustrates a standard high-level flow-battery cell architecture that uses a parallel plate architecture in accordance with embodiments of the invention. In particular, the flow-battery cell 600 includes a SLIC membrane 602, current collectors 604, and bipolar plates 606 for stacking cells.

Since, in many embodiments, both the oxidized and reduced form of the anolyte and catholyte can exist in solution, proper plate design comes down to a balance between electronic transport in the solid phase and ionic transport in the liquid phase. Since the ionic transport is orders of magnitude slower, it can be prudent to have a porous electrode that provides an electron donating/accepting surface anywhere that a redox active species can reach. The principle effort in this task will be to balance the need for high surface area, small channel flow to maximize electron transfer rates with the mechanical demands of sufficiently low pressure drop to minimize the balance-of-plant issues.

Figure 7:
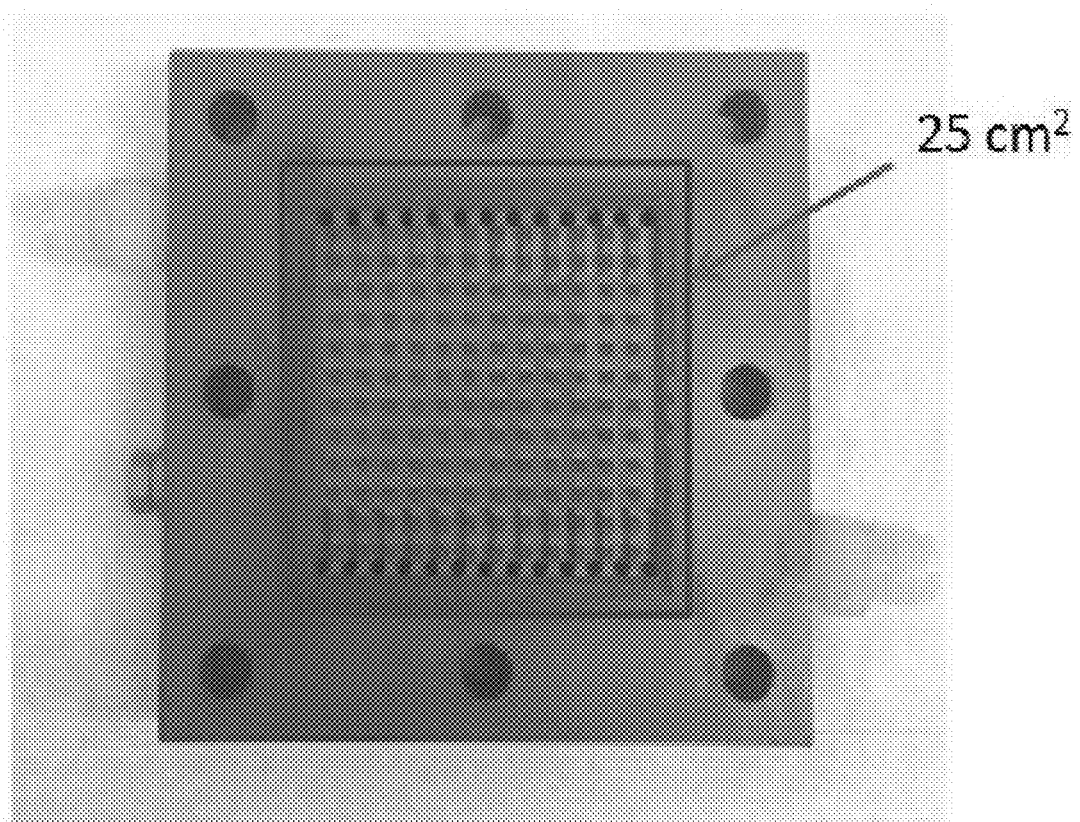
FIG. 7 illustrates a waffle pattern flow field that can be implemented in a flow battery in accordance with an embodiment of the invention.

In many embodiments, a waffle-pattern flow field is used within the cell. By way of example, FIG. 7 illustrates a waffle-pattern flow field that can be implemented in accordance with embodiments of the invention. A serpentine flow may also be implemented. The pump material and gasket material (used in pumping the anolyte and catholyte through the cell) may be fabricated from one of: silicon, Teflon, graphite, and Viton. In a number of embodiments, Toray carbon paper is used as the current collector, for both the anode and the cathode. In many embodiments, either graphite paper or felt is used for the current collector.

Using conventional architectures, lithium-based flow batteries in accordance with embodiments of the invention can achieve profound energy storage and distribution efficiencies. For example, in many embodiments, the lithium-based high energy density flow-battery is configured to produce 100 W, and in numerous embodiments, the lithium-based flow battery is configured to produce 1 kW. In a number of embodiments, the lithium-based flow battery has a current density of 50 mA/cm$^2$, with a voltage of 2.5 V. In many embodiments, a lithium-based flow battery includes 30 cell stacks, has an active cell area of 750 cm$^2$, provides 14.7 Amps, and can provide for approximately 75 Volts.

As can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A lithium-based flow battery comprising:
   a first anodic conductive solution that comprises a lithium polyaromatic hydrocarbon complex dissolved in a solvent;
   a second cathodic conductive solution that comprises a cathodic complex dissolved in a solvent; and
   a solid lithium ionic conductor, disposed so as to separate the first conductive solution from the second conductive solution, such that the first conductive solution, the second conductive solution, and the solid lithium ionic conductor define a circuit;
   wherein, when the circuit is closed, lithium from the lithium polyaromatic hydrocarbon complex in the first conductive solution dissociates from the lithium polyaromatic hydrocarbon complex, migrates through the solid lithium ionic conductor, and associates with the cathodic complex of the second cathodic conductive solution, and a current is generated.

2. The lithium-based flow battery of claim 1, wherein the first anodic conductive solution comprises a lithium-naphthalene complex dissolved in a solvent.

3. The lithium-based flow battery of claim 2, wherein the first anodic conductive solution comprises a solvent selected from one of: tetrahydrofuran, hexane, ethylene carbonate, propylene carbonate, dimethyl carbonate, diethyl carbonate, ethyl methyl carbonate, diethyl ether, dimethyl ether, gamma-butyrolactone, dimethoxyethane, dioxolane, methyl acetate, ethyl acetate, dimethyl acetamide, dimethyl formamide, dimethyl sulfoxide, and mixtures thereof.

4. The lithium-based flow battery of claim 2, wherein the second cathodic conductive solution comprises one of: an organic species and an organometallic species.

5. The lithium-based flow battery of claim 4, wherein the second cathodic conductive solution comprises dichloro-dicyanoquinodimethane.

6. The lithium-based flow battery of claim 5, wherein the second cathodic conductive solution comprises a solvent that is one of: tetrahydrofuran, hexane, ethylene carbonate, propylene carbonate, dimethyl carbonate, diethyl carbonate, ethyl methyl carbonate, diethyl ether, dimethyl ether, gamma-butyrolactone, dimethoxyethane, dioxolane, methyl acetate, ethyl acetate, dimethyl acetamide, dimethyl formamide, dimethyl sulfoxide, and mixtures thereof.

7. The lithium-based flow battery of claim 2, wherein the second cathodic conductive solution comprises a lithium polysulfide.

8. The lithium-based flow battery of claim 2, wherein the second cathodic conductive solution comprises lithium polysulfides in the form of $Li_xS_n$ where $3 \leq n \leq 8$.

9. The lithium-based flow battery of claim 5, wherein the solid lithium ionic conductor is ceramic.

10. The lithium-based flow battery of claim 9, wherein the solid lithium ionic conductor includes garnet phases.

11. The lithium-based flow battery of claim 10, wherein the solid lithium ionic conductor includes lithium lanthanum titanate.

12. The lithium-based flow battery of claim 5, wherein the solid lithium ionic conductor is a solid polymer electrolyte.

13. The lithium-based flow battery of claim 12, wherein the solid polymer electrolyte comprises copolymers.

14. The lithium-based flow battery of claim 5, wherein the solid lithium ion conductor is a LISICON.

15. The lithium-based flow battery of claim 2, further comprising:
   a cell, itself comprising a first channel, a first current collector, the solid lithium ion conductor, a second channel, and a second current collector;
   a first pump for pumping the first anodic conductive solution through the first channel of the cell;
   a first tank for storing the first anodic conductive solution before it is pumped through the first channel of the cell;
   a second tank for storing the first anodic conductive solution after it has been pumped through the first channel of the cell
   a second pump for pumping the second cathodic conductive solution through the second channel of the cell;
   a third tank for storing the second cathodic conductive solution before it has been pumped through the second channel of the cell; and a fourth tank for storing the second cathodic conductive solution after it has been pumped through the second channel of the cell;

wherein the first current collector and the second current collector can conduct current generated by redox reactions that occur in the cell, and can thereby power a load.

16. The lithium-based flow battery of claim 15, wherein at least one of the first pump and the second pump comprises a material selected from one of: silicon, Teflon, graphite, and Viton.

17. The lithium-based flow battery of claim 16, wherein at least one of the first current collector and the second current collector comprises one of: graphite paper, graphite felt, and Toray carbon paper.

18. A lithium-based flow battery comprising:
a lithium-based anode;
a cathode that is a conductive solution that includes an oxidizing agent that can facilitate the oxidation of the lithium-based anode; and
a solid lithium ionic conductor, disposed so as to separate the lithium-based anode from the cathode, such that the lithium-based anode, the cathode, and the solid lithium ionic conductor define a circuit;
wherein, when the circuit is closed, lithium from the lithium-based anode migrates through the solid lithium ionic conductor, and associates with the oxidizing agent in the cathode, and a current is generated.

19. The lithium-based flow battery of claim 18, wherein, the lithium-based anode is a solid.

20. The lithium-based flow battery of claim 18, wherein the lithium-based anode is a conductive solution that includes a lithium polyaromatic hydrocarbon complex dissolved in a solvent.

21. The lithium-based flow battery of claim 20, wherein the cathode includes lithium polysulfides dissolved in a solvent.

22. The lithium-based flow battery of claim 21, wherein the cathode includes lithium polysulfides in the form of $Li_xS_n$ where $3 \leq n \leq 8$.

23. The lithium-based flow battery of claim 22, wherein the solvent is one of: tetrahydrofuran, dimethyl sulfoxide, dimethyl formamide, dioxolane, dimethyl acetamide, dimethyl ether, dimethyl ether, a polar aprotic solvent, and mixtures thereof.

* * * * *

UNITED STATES PATENT AND TRADEMARK OFFICE
CERTIFICATE OF CORRECTION

PATENT NO. : 8,889,300 B2  
APPLICATION NO. : 13/779435  
DATED : November 18, 2014  
INVENTOR(S) : Ratnakumar V. Bugga et al.

Page 1 of 1

It is certified that error appears in the above-identified patent and that said Letters Patent is hereby corrected as shown below:

In the Claims

Col. 14, line 5, after "wherein" delete ","

Signed and Sealed this  
Twenty-first Day of April, 2015

Michelle K. Lee  
*Director of the United States Patent and Trademark Office*